United States Patent [19]

Tanaka et al.

[11] 4,412,251
[45] Oct. 25, 1983

[54] FLICKER PREVENTING CIRCUIT

[75] Inventors: Yutaka Tanaka, Yokohama; Toshinobu Isobe, Tokyo, both of Japan

[73] Assignee: Sony Corporation, Tokyo, Japan

[21] Appl. No.: 298,106

[22] Filed: Aug. 31, 1981

[30] Foreign Application Priority Data

Sep. 2, 1980 [JP] Japan ................... 55-121539

[51] Int. Cl.³ .............................................. H04N 5/14
[52] U.S. Cl. ..................................... 358/160; 358/140
[58] Field of Search .............. 358/160, 166, 140, 138

[56] References Cited
U.S. PATENT DOCUMENTS
4,300,162 11/1981 Robers ............................... 358/160

Primary Examiner—Richard Murray
Attorney, Agent, or Firm—Lewis H. Eslinger; Alvin Sinderbrand

[57] ABSTRACT

A flicker preventing circuit for a television receiver is disclosed which includes a first delay line for delaying an input video signal by one horizontal sweep period and producing a first delayed signal, a second delay line for delaying the input video signal by two horizontal periods and producing a second delayed signal, a switching circuit for selecting either the input video signal or the second delayed signal, the switching circuit being switched alternately according to which of the even and odd interlaced fields, respectively, is being displayed, an adder for adding the output signal from the switching circuit and the first delayed signal each other, and a level changing circuit for changing the level of either the input video signal or the second delayed signal relative to the level of the first delayed signal.

7 Claims, 15 Drawing Figures

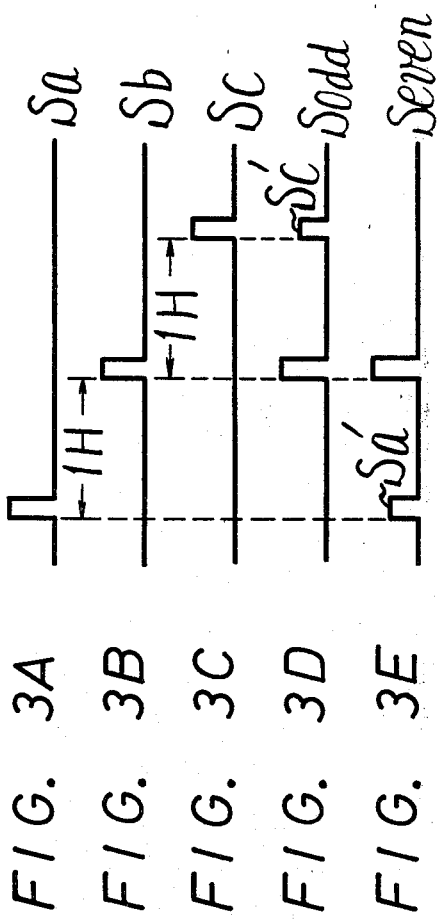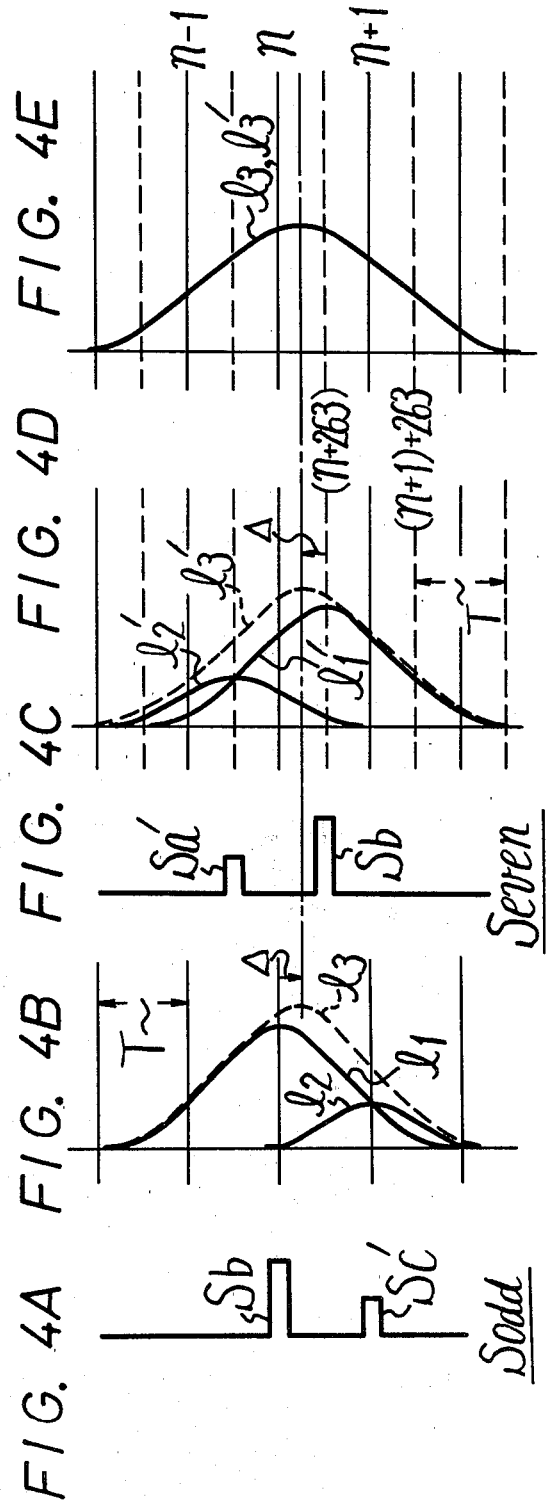

FLICKER PREVENTING CIRCUIT

BACKGROUND OF THE INVENTION

1. Field of the Invention

This invention is related generally to a flicker preventing circuit for use with a television receiver and more particularly to a flicker preventing circuit for use with a television receiver which will receive a character broadcasting signal such as a teletext signal.

2. Description of the Prior Art

Generally, a flicker is more perceptible to a viewer receiving a character broadcasting signal, such as a teletext signal, than in a conventional television signal. Referring to FIG. 1, there is seen a video signal S which rises very sharply, for example, a portion of a vertical line in a teletext signal. When such a signal is supplied to a cathode ray tube, the brightness distribution on the picture screen of the cathode ray tube caused by the signal S may be represented by a solid line curve $l_0$ when an odd field is being displayed (the horizontal lines at this time are shown by the solid lines in FIG. 1). In an even field, however, the brightness distribution (the horizontal lines at this time are shown by the broken lines in FIG. 1) may be as shown by a broken line curve $l_e$. Therefore, the brightness distribution moves up and down (the vertical scanning direction) as the fields alternate, so that, especially at the edge portion of the picture in the vertical direction, a flicker in the edge portion is very perceptible to a viewer.

OBJECTS AND SUMMARY OF THE INVENTION

Accordingly, an object of the present invention is to provide a flicker preventing circuit for use with a television receiver.

Another object of the present invention is to provide a flicker preventing circuit for use with a television receiver which is simple in construction but can positively avoid the generation of any flickering at the edge of the television screen of a video signal which rises very sharply.

According to an aspect of the present invention, there is provided a flicker preventing circuit for a television receiver which displays interlaced even and odd video fields during successive field periods in response to an input video signal, each of said fields comprising a plurality of horizontal lines displayed during successive horizontal periods, said circuit comprising:

delay means receiving said input video signal and providing therefrom first and second delayed signals which are delayed by one horizontal period and by two horizontal periods, respectively, relative to said input video signal;

processing means receiving said input video signal and said first and second delayed signals and delivering said input video signal and said second delayed signal alternately during successive field periods, as a first output of said processing means, and said first delayed signal as a second output of said processing means, with the level of said first output being different from the level of said second output; and adding means for adding said first and second outputs of said processing means and providing a corresponding sum signal as the output of said flicker preventing circuit.

The above, and other objects, features and advantages of the present invention will become apparent from the following descirption of illustrative embodiments taken in conjunction with the accompanying drawings, in which the like references designate like elements and parts.

BRIEF DESCRIPTION OF THE DRAWINGS

FIGS. 3A to 3E are waveform diagrams used to explain the operation of the flicker preventing circuit shown in FIG. 2;

FIGS. 4A to 4E are schematic diagrams used to explain the brightness distribution produced by the illustrated embodiment of the invention.

DESCRIPTION OF THE PREFERRED EMBODIMENTS

Figure 1:
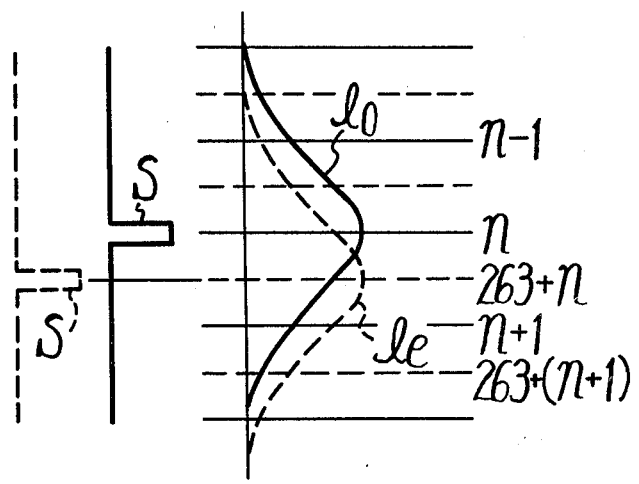
FIG. 1 is a brightness distribution graph used to explain a television image flicker.
Figure 2:
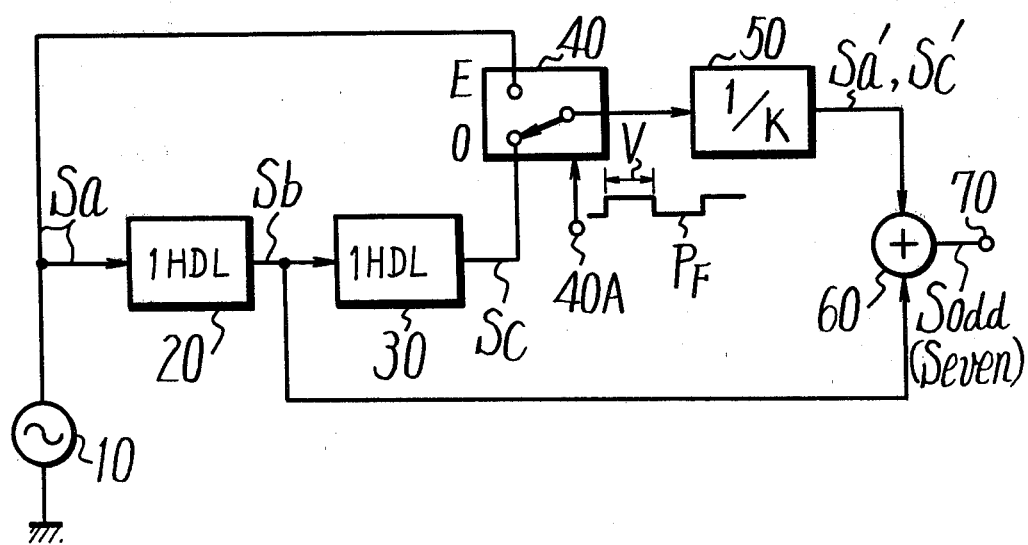
FIG. 2 is a systematic block diagram showing an example of a flicker preventing circuit according to the present invention.

With reference to FIG. 2, a first example of the flicker preventing circuit according to the present invention will be described. In this case, this invention is applied to, by way of example, a television receiver which can receive a character broadcasting signal such as a teletext signal, wherein the flicker preventing circuit of the invention is provided in the transmission line or path of a video signal, especially the demodulated luminance signal, and is disconnected from the signal transmission line during times other than when receiving the teletext signal.

In an example of the flicker preventing circuit of the invention shown in FIG. 2, reference numeral 10 designates a signal source of a video signal $S_a$. In this case, as the video signal $S_a$, such a pulse signal as shown in FIG. 3A may be considered by way of explanation. The pulse signal or video signal $S_a$ from the signal source 10 is fed to delay lines 20 and 30, each of which produces a 1H (one horizontal sweep period) delay time and which are connected in series with each other. If a video signal which is delayed by 1H through the delay line 20 is shown at $S_b$ (refer to FIG. 3B) and a video signal which is the result of further delaying the signal $S_b$ by 1H through the delay line 30 is shown at $S_c$ (refer to FIG. 3C), the video signal $S_c$ is a pulse signal delayed by 2H from the original video signal $S_a$. The video signal $S_a$ from the signal source 10 and the 2H-delayed video signal $S_c$ from the delay line 30 are both applied to a switching circuit 40.

The switching circuit 40 alternatively delivers the video signals $S_a$ and $S_c$ for the even and odd fields, respectively, in response to a switching pulse $P_F$ having same period as an entire frame, supplied to the switching circuit 40 through a terminal 40A. Since the character broadcasting video signal is part of each field, when the field thereof is an odd field, the position of the switching circuit 40 is as shown in FIG. 2 by a letter O, while when the field is an even field, the position is changed over to the position E in FIG. 2.

The video signals $S_a$ and $S_c$, which alternate as the even and odd fields alternate, are fed to a level changing circuit, such as a suppressing, attenuating or reducing circuit 50, which suppresses or reduces the level of the signals applied thereto by 1/K, the signals then becoming reduced video signals $S_a'$ and $S_c'$ (refer to FIGS. 3E and 3D). The video signals $S_a'$ and $S_c'$ whose levels are reduced as set forth above are applied to an adder 60 to which the video signal $S_b$ is applied from the delay line 20, so that the video signals $S_a'$ and $S_c'$ are added to the video signal $S_b$ in the added 60. Accordingly, if the character broadcasting video signal $S_a$ occurs during an odd field, the video signal $S_c'$, which is delayed by 2H from the original video signal $S_a$ and reduced in level, and the video signal $S_b$, which is delayed by 1H from the original video signal $S_a$, are added to each other by the adder 60 during the odd field. Thus, a video signal $S_{odd}$ shown in FIG. 3D is derived from the adder 60 to an output terminal 70 during the odd field. If a video signal on an n'th line is taken to be $S_b$, the video signal $S_{odd}$ at the output terminal 70 becomes as shown in FIG. 4A. Thus, the brightness distribution caused by this video signal $S_{odd}$ becomes as shown in FIG. 4B. That is, in FIG. 4B the brightness distribution caused by the video signal $S_b$ is represented by a solid line curve $l_1$ and that caused by the 1H-delayed video signal $S_c'$ is represented by a solid line curve $l_2$. Therefore, at this time, the brightness distribution by the integrating operation of the human eye becomes that shown by a broken line curve $l_3$ in FIG. 4B. That is, the peak value of the brightness distribution represented by the broken line curve $l_3$ is displaced downward from that represented by the solid line curve $l_1$ $\Delta$ as apparent from FIG. 4B.

On the other hand, since it is the video signal $S_b$ which is delayed by 1H relative to the original video signal $S_a$ and the reduced video signal $S_a'$ that are added during the adder 60 in the even field, the video signal seven shown in FIG. 3E is obtained at the output terminal 70. In this case, the video signal $S_b$ is an output corresponding to (n+263)'th line in the even field, so that the brightness distribution caused by the added video signal seven becomes as shown in FIG. 4D. In FIG. 4D, a solid line curve $l'$, represents the brightness distribution caused by the video signal $S_b$ and a solid line curve $l_2'$ represents the brightness distribution caused by the video signal $S_a'$ whose level is reduced. Thus, the composite brightness distribution of this case becomes as shown by a broken line curve $l_3'$ whose peak value is displaced upwards by $\Delta$ from the (n=263)'th line. At this time, the displaced amount $\Delta$ of the peak value is same as that in the odd field, but the displacing direction is opposite to that in the odd field. Therefore, the composite or added brightness distribution in the odd field becomes the same as that in the even field (refer to FIG. 4E). Accordingly, the flicker at the edge portion can be prevented from being generated.

In this inveniton, the displacing amount $\Delta$ is determined by the factor K applied by the level changing or reducing circuit 50 and it is estimated that the displacing amount $\Delta$ should be selected to be about T/4 where T is the line pitch in the vertical direction.

Other examples of the present invention will be described with reference to FIGS. 5, 6 and 7 in which the same reference numerals as those of FIG. 2 represent the same elements and parts and their detailed explanation will be omitted for the sake of brevity.

In the example of the invention shown in FIG. 2, the signal $S_c$ delayed by 2H relative to the original video signal $S_a$ is provided by using two 1H-delay lines 20 and 30 connected in series.

Figure 5:
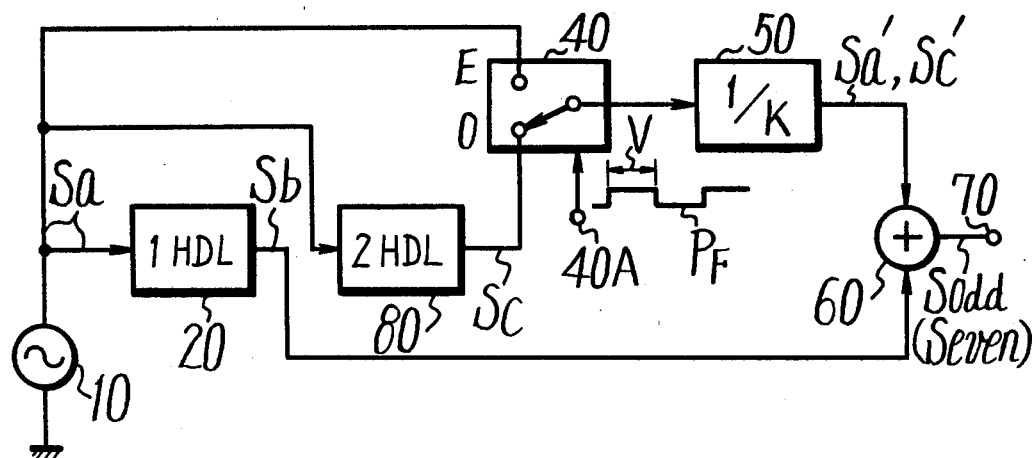
FIGS. 5, 6 and 7 are systematic block diagrams respectively showing other embodiments of the invention.

It is however, possible that, as shown in FIG. 5, a 2H-delay line 80 may be separately provided to which the original video signal $S_a$ is supplied from the signal source 10 to produce the 2H-delayed signal $S_c$. In this case, 1H delay line 30 used in FIG. 2 is of course omitted.

Figure 6:
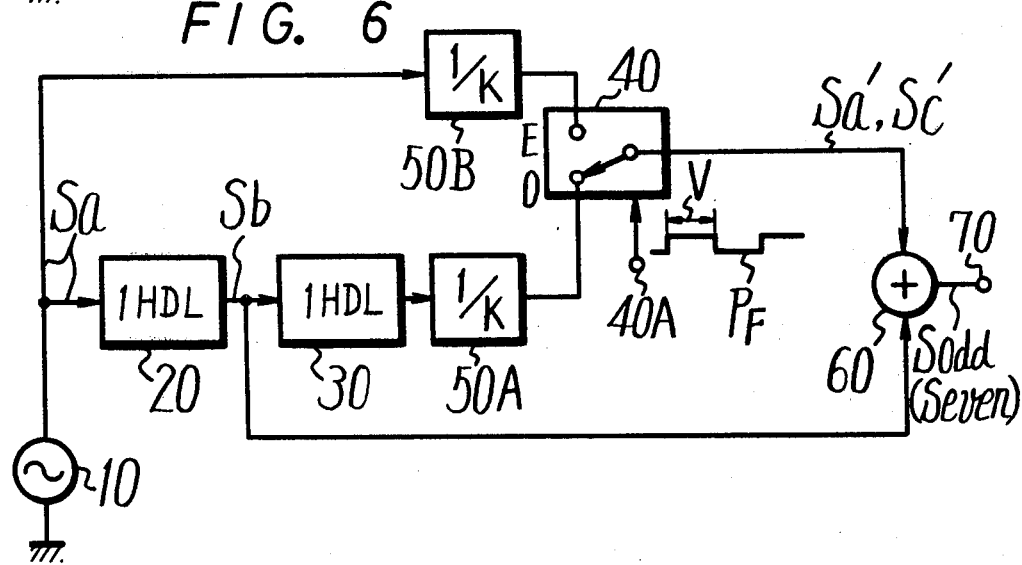

Further, instead of providing the level changing or reducing circuit 50 at the output side of the switching circuit 40 as in FIG. 2, it is possible with the same effect that, as shown in FIG. 6, two level changing or reducing circuits 50A and 50B, each reducing by the same factor 1/K, may be provided at the odd and even input sides of the switching circuit 40.

Figure 7:
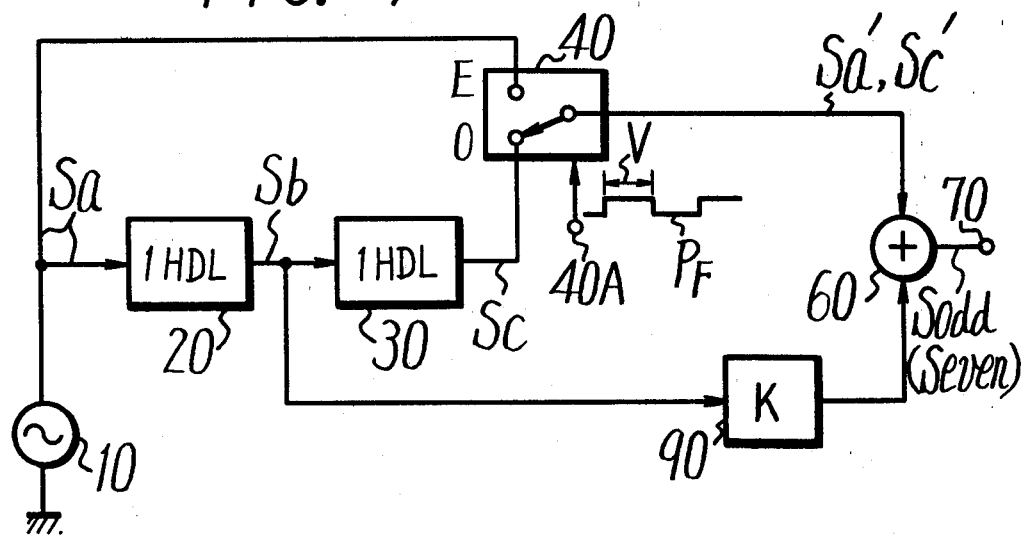

Moreover, in place of providing the level reducing circuit 50 at the output side of the switching circuit 40 as in FIG. 2, it is possible that, as shown in FIG. 7, a level changing circuit such as an amplifier 90 may be inserted between the 1H-delay line 20 and the adder 60 to amplify the signal $S_b$ by K times, by which the same effect as that of the foregoing examples can be obtained.

As described above, according to the present invention the flicker at the edge portion of a picture can be positively prevented from being generated, so that this invention is very suitable to be employed in a receiving circuit for a character broadcasting video signal, such as a teletext signal, which rises very sharply.

Although the above description has been given of particular preferred embodiments of the invention, with reference to the accompanying drawings, it will be apparent that many modificaitons and variations could be effected by one skilled in the art without departing from the spirit and scope of the novel concepts of the invention, so that the scope of the invention should be determined by the appended claims only.

We claim as our invention:

1. A flicker preventing circuit for a television receiver which displays interlaced even and odd video fields during successive field periods in response to an input video signal, each of said fields comprising a plurality of horizontal lines displayed during successive horizontal periods, said circuit comprising:

delay means receiving said input video signal and providing therefrom first and second delayed signals which are delayed by one horizontal period and by two horizontal periods, respectively, relative to said input video signal;

processing means receiving said input video signal and said first and second delayed signals and including means for alternatively delivering said input video signal and said second delayed signal during successive field periods, as a first output of said processing means, and delivering said first delayed signal as a second output of said processing means, with the level of said first output being different from the level of said second output; and adding means for adding said first and second outputs of said processing means and providing a corresponding sum signal as the output of said flicker preventing circuit.

2. A flicker preventing circuit as in claim 1; wherein said delay means includes first delay means receiving said input video signal and delaying said input video signal by one horizontal period for providing said first delayed signal, and second delay means receiving said input video signal and delaying said input video signal by two horizontal periods for providing said second delayed signal.

3. A flicker preventing circuit as in claim 2; wherein said processing means includes switching means receiving said input video signal and said second delayed signal and being changed over during successive field periods for alternately selecting said input video signal and said second delayed signal as its output, and level changing means receiving said output of said switching means and changing a level thereof relative to a level of said first delayed signal, with the output of said level changing means being said first output of said processing means.

4. A flicker preventing circuit as in claim 1; wherein said delay means includes first delay means receiving said input video signal and delaying the latter by one horizontal period for providing said first delayed signal, and second delay means receiving said first delayed signal and further delaying the latter by one horizontal period for providing said second delayed signal.

5. A flicker preventing circuit as in claim 4; wherein said processing means includes first level changing means receiving said input video signal and providing a corresponding output with a level thereof changed relative to a level of said first delayed signal, second level changing means receiving said second delayed signal and providing a corresponding output with a level thereof changed relative to a level of said first delayed signal, and switching means selecting said outputs of said first and second level changing means alternately during successive field periods as said first output of said processing means.

6. A flicker preventing circuit as in cliam 4; wherein said processing means includes switching means receiving said input video signal and said second delayed signal and being changed over during successive field periods for alternately selecting said input video signal and said second delayed signal as said first output of said processing means, and level changing means receiving said first delayed signal and changing a level thereof relative to a level of said input video signal and said second delayed signal, with the output of said level changing means being said second output of said processing means.

7. A flicker preventing circuit as in claim 4; wherein said processing means includes switching means receiving said input video signal and said second delayed signal and changed over during successive field periods for alternately selecting said input video signal and said second delayed signal as the output of said switching means, and level changing means receiving said output of the switching means and changing a level thereof relative to a level of said first delayed signal, with the output of said level changing means being said first output of said processing means.

* * * * *